United States Patent
El Abed et al.

(10) Patent No.: US 11,088,854 B2
(45) Date of Patent: Aug. 10, 2021

(54) SECURING BLOCKCHAIN ACCESS THROUGH A GATEWAY ON BEHALF OF A COMMUNICATION DEVICE

(71) Applicant: Nokia Technologies Oy, Espoo (FI)

(72) Inventors: Haithem El Abed, Nozay (FR); Bessem Sayadi, Nozay (FR)

(73) Assignee: Nokia Technologies Oy, Espoo (FI)

( * ) Notice: Subject to any disclaimer, the term of this patent is extended or adjusted under 35 U.S.C. 154(b) by 282 days.

(21) Appl. No.: 16/263,714

(22) Filed: Jan. 31, 2019

(65) Prior Publication Data

US 2019/0245697 A1 Aug. 8, 2019

(30) Foreign Application Priority Data

Feb. 5, 2018 (EP) .................................... 18155107

(51) Int. Cl.
*H04L 9/32* (2006.01)
*G06Q 20/22* (2012.01)
(Continued)

(52) U.S. Cl.
CPC ......... *H04L 9/3265* (2013.01); *G06Q 20/027* (2013.01); *G06Q 20/223* (2013.01);
(Continued)

(58) Field of Classification Search
CPC ..... H04L 9/3265; H04L 9/0618; H04L 63/12; H04L 2209/38; H04W 12/10
(Continued)

(56) References Cited

U.S. PATENT DOCUMENTS 10,755,226 B1 * 8/2020 Robyak .............. G06K 7/10366
2016/0330034 A1 11/2016 Back et al.
(Continued)

FOREIGN PATENT DOCUMENTS

WO WO 2017/190795 A1 11/2017

OTHER PUBLICATIONS

Anonymous, "Unstoppable Data for Unstoppable Apps: DATAcoin by Streamr," https://s3.amazonaws.com/streamr-public/streamr-datacoin-whitepaper-draft-2017-05-25-v1_0.pdf, pp. 1-27, XP055488248, 2017.

*Primary Examiner* — Bryan F Wright
(74) *Attorney, Agent, or Firm* — Fay Sharpe LLP

(57) ABSTRACT

For securing a blockchain access through a gateway (GAT) on behalf of a communication device (CD) in a wireless telecommunication network (TN), an apparatus (AM) operating with the gateway:
  receives a request (Req) sent from a communication device (CD) through the gateway (GAT), the request containing an identifier (IdCD) of the communication device, an identifier (IdR) of the request and a key (K),
  checks a distributed blockchain that includes information regarding the communication device and that is stored in a first blockchain network (BN1) and retrieving a value (V) corresponding to the key (K),
  creates a smart contract based on the key (K), the value (V), a timestamp (T), the identifier (IdCD) of the communication device, and the identifier (IdR) of the request, the smart contract being defined to confirm the validity of value (V) corresponding to the key (K) in the first blockchain network (BN1),
  appends the smart contract to a second blockchain network (BN2), the smart contract having to be executed on the first blockchain network (BN1) by at least one
(Continued)

validator having access to the first blockchain network (BN1) and second blockchain network (BN2), signs a response (Res) containing the key (K), the value (V), and the identifier (IdR) of the request with a certificate (Cert), sends the response (Res) to the communication device (CD) through the gateway (GAT).

12 Claims, 2 Drawing Sheets

(51) Int. Cl.
*H04L 29/06* (2006.01)
*G06Q 20/02* (2012.01)
*H04L 9/06* (2006.01)
*H04W 12/10* (2021.01)

(52) U.S. Cl.
CPC .......... *H04L 9/0618* (2013.01); *H04L 9/3236* (2013.01); *H04L 9/3297* (2013.01); *H04L 63/0823* (2013.01); *H04L 63/12* (2013.01); *H04W 12/10* (2013.01); *H04L 2209/38* (2013.01)

(58) Field of Classification Search
USPC .......................................................... 713/156
See application file for complete search history.

(56) References Cited

U.S. PATENT DOCUMENTS

2017/0352027 A1  12/2017  Zhang et al.
2018/0130050 A1*  5/2018  Taylor .................... H04L 9/3247
2018/0191714 A1*  7/2018  Jentzsch ................ G06F 21/445
2018/0365686 A1*  12/2018  Kondo .................. H04L 63/123
2020/0349556 A1*  11/2020  Yao ........................ G06Q 20/223

* cited by examiner

SECURING BLOCKCHAIN ACCESS THROUGH A GATEWAY ON BEHALF OF A COMMUNICATION DEVICE

FIELD OF INVENTION

The present subject matter generally relates to communication device authentication in Internet of Things (IoT) networks or similar networks.

BACKGROUND

In IoT networks, devices may have to register with different local networks or through platforms provided by the mobile network. Each of the devices may have its own registration and authentication mechanisms that can consume multiple resource cycles. For blockchain based authentication, nodes may have to consult a blockchain, which can be a hurdle for nodes having low storage capacity and low resources. To that end, a solution consists of using a provider playing the role of a proxy between the device and the blockchain may be used.

However, that kind of solution has the drawback that the device would have to trust the provider, which will defeat the purpose of using a distributed blockchain designed in the first place to avoid a central entity.

There is a need to check the validity of messages exchanged by the service provider that should not cheat without being caught.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, a method for securing a blockchain access through a gateway on behalf of a communication device in a wireless telecommunication network, comprises the following steps in an apparatus operating with the gateway:

receiving a request sent from a communication device through the gateway, the request containing an identifier of the communication device, an identifier of the request and a key, checking a distributed blockchain that includes information regarding the communication device and that is stored in a first blockchain network and retrieving a value corresponding to the key, creating a smart contract based on the key, the value, a timestamp, the identifier of the communication device, and the identifier of the request, the smart contract being defined to confirm the validity of value corresponding to the key in the first blockchain network, appending the smart contract to a second blockchain network, the smart contract having to be executed on the first blockchain network by at least one validator having access to the first blockchain network and second blockchain network, signing a response containing the key, the value, and the identifier of the request with a certificate, sending the response to the communication device through the gateway.

Advantageously, the gateway cannot cheat by sending a false value to the IoT communication device and appending a good value to the first blockchain network. Indeed, the steps of signing response and appending smart contract are guaranteed to form an atomic operation and the successful execution of the smart contract validates the correctness of the response.

In an embodiment, the apparatus is implemented in a multiple Platform as a Service (PaaS) of a wireless network having specialized components providing customized functionalities.

In an embodiment, the certificate was previously retrieved from a code generator.

In an embodiment, the certificate is received from the code generator by a dedicated module for signing the response after verification that the dedicated module is running in a secure environment.

In an embodiment, the apparatus sends a notification to the validators for getting a reward after having checked that the smart contract has been executed in the first blockchain network.

In an embodiment, the step of appending the smart contract to the second blockchain network can be executed in a same secure execution environment as the step of signing the response.

In an embodiment, the authentication module increments a counter for each signing operation, this counter being used as an identifier inside the smart contract.

In another implementation an apparatus for securing a blockchain access through a gateway on behalf of a communication device in a wireless telecommunication network is provided. The apparatus comprises:

one or more network interfaces to communicate with a network;

a processor coupled to the network interfaces and configured to execute one or more processes; and a memory configured to store a process executable by the processor, the process when executed operable to:

receive a request from a communication device, the request containing an identifier of the communication device, an identifier of the request and a key, checking a distributed blockchain that includes information regarding the communication device and that is stored in a first blockchain network and retrieving a value corresponding to the key, creating a smart contract based on the key, the value, a timestamp, the identifier of the communication device, and the identifier of the request, the smart contract being defined to confirm the validity of value corresponding to the key in the first blockchain network, appending the smart contract to a second blockchain network, the smart contract having to be executed on the first blockchain network by at least one validator having access to the first blockchain network and second blockchain network, signing a response containing the key, the value, and the identifier of the request with a certificate, sending the response to the communication device.

In another implementation a computer-readable medium having embodied thereon a computer program for executing a method for securing a blockchain access through a gateway on behalf of a communication device in a wireless telecommunication network is provided. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
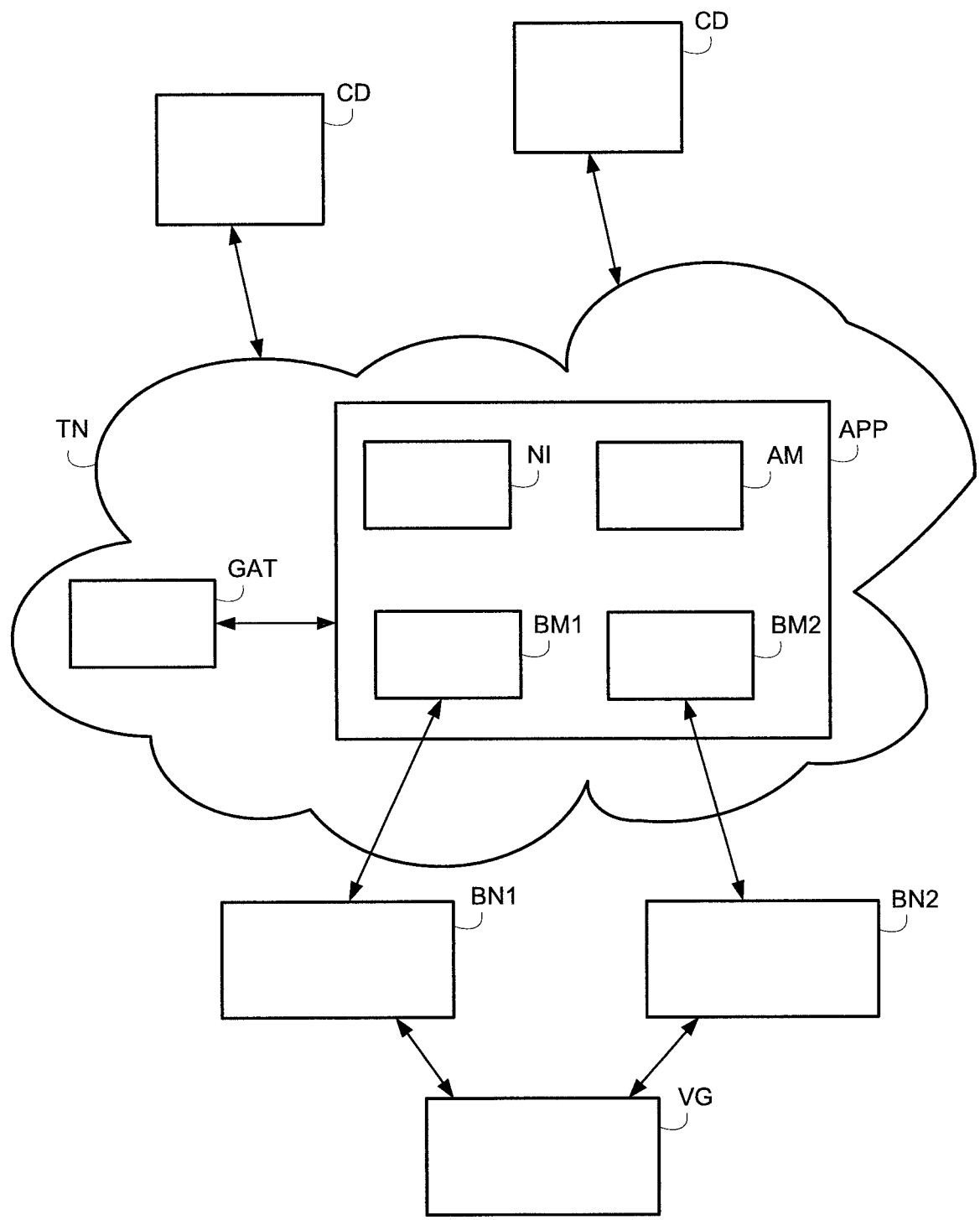
FIG. 1 illustrates a schematic block diagram of a communication system according to one embodiment of the invention for a method for securing a blockchain access through a gateway on behalf of a communication device in a wireless telecommunication network.

Referring to FIG. 1, an apparatus APP forming a communication system may communicate with a set of communication devices CD, a first blockchain network BN1 and a second blockchain network BN2 through a gateway GAT provided by a telecommunication network TN. The communication system further communicates with a validation group VG composed of validators.

The telecommunication network TN is for example a digital cellular radio communication network of the GPRS (General Packet Radio Service), UMTS (Universal Mobile Telecommunications System), CDMA (Code Division Multiple Access) type, LTE (Long Term Evolution) or even 5G (Fifth Generation) type. Furthermore, the wireless telecommunication network TN can be accessed by the mobile device via a wireless link, such as a Wi-Fi network or Bluetooth connection.

The gateway GAT is playing a role of a proxy between the communication device and a corresponding blockchain. The gateway GAT could be a generic framework for many functions (e.g. a middleware for IoT managements), and the apparatus APP is an add-on (plugin) for the gateway.

In one preferred embodiment, the telecommunication network TN is a 5G Network and the communication system is implemented in a multiple Platform as a Service (PaaS) having specialized components providing customized functionalities. In this case, the gateway GAT is also implemented in the Platform as a Service.

Data packets (e.g., traffic and/or messages sent between the communication devices CD) may be exchanged among the communication devices CD using predefined network communication protocols such as certain known wired protocols, wireless protocols (e.g., IEEE Std. 802.15.4, WiFi, Bluetooth®, etc.), or other shared-media protocols where appropriate. In this context, a protocol consists of a set of rules defining how the nodes interact with each other.

Innovative decentralized data storage solutions, such as blockchains enable to provide provenance and also to avoid the need to rely on third parties to regulate information and data systems. In addition, blockchain platforms can host "smart contracts" which could replace established methods based on human witnesses with logical software-implemented protocols.

"Smart contracts" may be defined as computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

A blockchain network relies on a blockchain architecture that is a distributed computing architecture where every network node executes and records the same transactions grouped into blocks. Only one block can be added at a time, and every block contains a mathematical proof that verifies that it follows in sequence from the previous block. In this way, the blockchain's distributed database is kept in consensus across the whole network, and this is achieved without the need of a central authority. Nodes that maintain and verify the network may be incentivized by mathematically enforced economic incentives coded into the protocol. The blockchains can work in different ways, as well as in different scales.

The nodes of a blockchain network may comprise corporate, authority, and/or user devices, such as a server, a desktop/tablet/laptop computer, smartphone or other suitable electronic device. The system may comprise an administrator or management node, a relay or other kind of intermediate device for connecting a node to further networks or services, such as another distributed or centralized computing system or a cloud service. The nodes are mutually addressable in a suitable way, for example, they may be connected to an internet protocol, IP, network. Messages released into the IP network with a recipient address are routed by the network to the recipient node identified by the recipient address. IP is not the only suitable networking technology used, for example, other peer-to-peer networking models are also suitable.

The blockchain state information shared by the nodes may store all the transactions and history carried out in the network. The blockchain state information is stored in or as a blockchain ledger. Each node comprises the ledger whose content is in sync with other ledgers. The nodes may validate and commit transactions in order to reach consensus. Each node may have their own copy of the ledger and is permission-controlled, so participants see only appropriate transactions. Application of blockchain technology and the ledger enable a way to track the unique history of transactions by the individual nodes in the network.

In various embodiments, blockchain process may be configured to perform node/device identification and authentication using a distributed block chain that includes information regarding the various nodes/devices in the network. Block chaining first emerged in the realm of cryptocurrencies and generally operates by ensuring a consensus among devices using a peer-to-peer, distributed database. Sometimes also referred to as alternative chaining outside the realm of cryptocurrencies, block chaining provides that each peer device in the system maintain a copy of the entire list of changes in the system. For example, in the case of cryptocurrencies, the distributed database includes a listing of every transaction in which the cryptocurrency is exchanged.

A blockchain begins with the creation of a 'genesis' block. Each subsequent block then includes a hash of the previous block in the block chain. This has two effects: 1.) modifying an existing block would also require regenerating each block after it, which is highly impractical from a computational standpoint and prevents malicious changes and 2.) the hashing mechanism provides an ordering to the blocks that traces all the way back to the genesis block, allowing devices to track changes in the system. The actual data content of the blocks can also vary. For example, while blocks in a cryptocurrency typically include a listing of currency exchanges/transactions, the data in the blocks is not limited as such and can include any information.

In some cases, blocks in a blockchain can also make use of a digital signature mechanism to validate the contents of a block. For example, in the case of cryptocurrencies, a transaction that transfers funds between entities can also include a digital signature and a corresponding public key that can be used to ensure that entity performing the transfer actually has ownership of the funds.

In "Internet of Things" network, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, locks, etc. The "Internet of Things" thus generally refers to the interconnection of objects (e.g., smart objects), over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars, it has been of the utmost importance to extend the IP protocol suite for these networks Particularly in the context of the IoT and similar networks, device identity and management is a key building block for a viable end-to-end solution. Depending on the particular use case, a "thing" (e.g., a node or a device) may have to register or authenticate its identity with different service enablers that may use various service-specific procedure Some techniques provide for the use of a blockchain based mechanism that conveys information regarding the identity of nodes and/or other metadata regarding the nodes, to control the behavior of the nodes in the networks. In some aspects, the PaaS acts as a proxy to update node information in the block chain on behalf of the nodes, so as not to require nodes with constrained resources to perform the updates themselves.

The first blockchain network BN1 may be set by the manufacturer of the IoT devices and may be a cryptocurrency blockchain network. A distributed blockchain including information regarding the communication devices is stored in this first blockchain network.

The second blockchain network BN2 may be set by the operator of the telecommunication network TN and may be a private blockchain network.

The validation group has access to the first blockchain network BN1 and the second blockchain network BN2.

The apparatus is responsible of handling the queries coming from the communication devices CD.

The apparatus contains a first blockchain module BM1 participating in the first blockchain network BN1 and second blockchain module BM2 participating in the second blockchain network BN2.

The first blockchain module BM1 is a functional block participating to the first blockchain network BN1 and have real time access to the full related blockchain.

The second blockchain module BM2 is a functional block participating to the second blockchain network BN2 carrying smart contracts that allows the verification of the exactitude of the queries responses as well as the payment of the validator.

The apparatus contains an authentication module AM running an authenticated code retrieved from code generator CG and its execution is protected from any tempering or snooping by the platform running it.

Moreover the apparatus may be any suitable physical hardware configuration such as: one or more server(s), blades consisting of components such as processor, memory, network interfaces or storage devices. In some of these embodiments, the apparatus may include cloud network resources that are remote from each other.

In some embodiments, the apparatus may be virtual machine. In some of these embodiments, the virtual machine may include components from different machines or be geographically dispersed. For example, the first blockchain module BM1 and the second blockchain module BM2 may be in two different physical machines.

The apparatus may comprise one or more network interfaces NI (e.g., wired, wireless, etc.), at least one processor, and a memory interconnected by a system bus and powered by a power source (e.g., one or more batteries or other charge storage devices, a power line, etc.).

The network interface(s) contain the mechanical, electrical, and signaling circuitry for communicating data over links coupled to the telecommunication network TN. The network interfaces may be configured to transmit and/or receive data using a variety of different communication protocols.

The memory comprises a plurality of storage locations that are addressable by the processor and the network interfaces NI for storing software programs and data structures associated with the embodiments described herein. The processor may comprise hardware elements or hardware logic adapted to execute software programs. An operating system, portions of which are typically resident in memory and executed by the processor, functionally organizes the device by, inter alia, invoking operations in support of software processes and/or services executing on the device. These software processes and/or services comprise a block chain process executed in blockchain modules BM1 and BM2.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

The apparatus further contains an authentication module AM responsible for creating a "smart contract" that is appended by the second blockchain module BM2 to the second blockchain network BN2. The purpose of this structure is to allow a member of the validation group to execute the smart contract on the first blockchain network BN1.

The authentication module AM may be instantiated by the creation of a secure execution environment, that is remotely attested by code generator CG (for example an Enclave using a Software Guards Extension (SGX) or a Hardware Secure Module (HSM) that comes with a built in certificate) and a remote attestation server. Once the code generator CG verifies that the authentication module AM is running in a secure environment, it will send it a certificate Cert (i.e. a private portion of the certificate to be used for signing responses to send back to communication devices.

Figure 2:
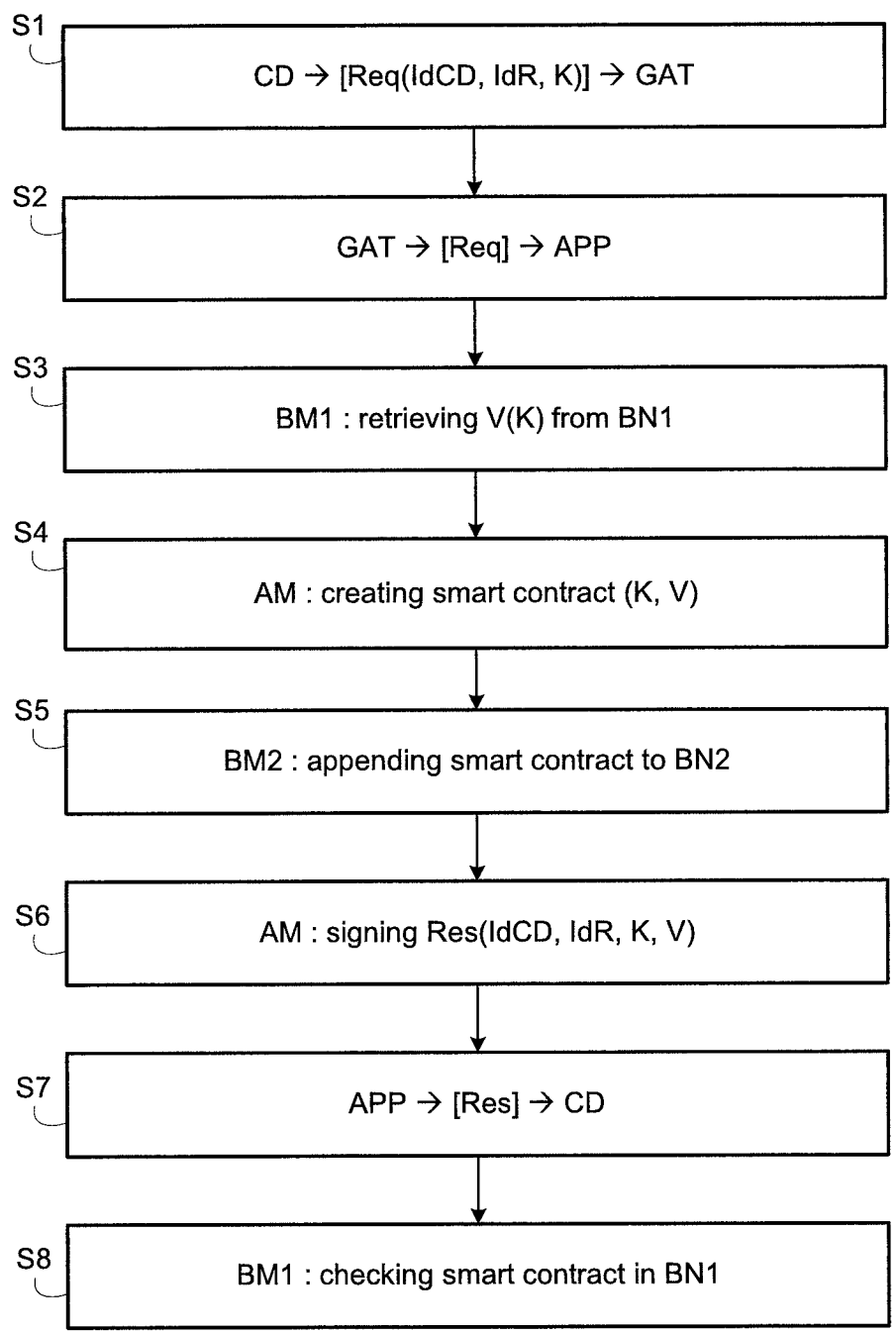
FIG. 2 illustrates a flow chart illustrating a method for securing a blockchain access through a gateway on behalf of a communication device in a wireless telecommunication network according to one embodiment of the invention.

With reference to FIG. 2, a method for securing a blockchain access through a gateway on behalf of a communication device in a wireless telecommunication network according to one embodiment of the invention comprises steps S1 to S8.

In step S1, the communication device CD sends a request Req to the gateway GAT. The request may be an interrogation, or an order. In all cases, it is assumed that the request contains an identifier IdCD of the communication device, an identifier IdR of the request and a key K.

In step S2, this request Req is forwarded to the network interface NI of the apparatus APP that analyzes the content of the request.

Un step S3, the first blockchain module BM1 checks the corresponding blockchain stored in the first blockchain network BN1 and retrieves a value V corresponding to the key K.

In step S4, the authentication module AM creates a smart contract based on the key K, the value V, a timestamp T, the identifier IdCD of the communication device, and the identifier IdR of the request. The identifiers IdCD and IdR are embedded in the smart contract as information to distinguish a communication among the communication devices and a query between multiple queries made by the same communication device. The module AM stores a global counter CTG that is incremented with each signature of a response. The counter CTG is used in the smart contract that is created by the authentication module and corresponds to the said signature. A counter CTG_last corresponds to the counter for the last successfully executed smart contract on the first blockchain network BN1.

The terms of the smart contract may be as follow:
Input: Timestamp T, (K, V), holder, CTG
Conditions: if (K, V) is valid at Timestamp T on the first blockchain network and if holder is member of the validation group and if CTG=CTG_last+1.
Output: payment to the holder an x amount of cryptocurrency.

In step S5, the second blockchain module BM2 appends the smart contract to the second blockchain network BN2. The smart contract has to be executed on the first blockchain network BN1 by at least one validator. The validator insures that the provider sends the correct response value to the communication device, otherwise the smart contract fails to execute and the provider will be caught cheating.

In step S6, the authentication module AM signs a response Res containing the key K, the value V, the identifier IdCD of the communication device and the identifier IdR of the request with a certificate Cert. The certificate was previously retrieved from the code generator CG.

The step S6 may be executed before or at the same time that step S4.

In step S7, the apparatus sends the response Res through the gateway GAT to the communication device CD which checks that the signature is valid and accepts the value as a response to its previous query. It is assumed that the communication device is able to get credentials corresponding to the certificate Cert.

In step S8, the first blockchain module BM1 checks if the smart contract has been executed in the first blockchain network. If the smart contract has been executed, the apparatus sends a notification to the validators for getting a reward. The payment is thus asynchronous, the output of the smart contract is some sort of an obligation of payment that the first blockchain module BM1 detects to send a notification to the validators to receive payment. In one variant, the payment is automatic using a crypto currency of the first blockchain network, it is included in the execution of the smart contract.

The validators insure that the provider has sent the correct response value to the IoT communication device, otherwise the contract fails to execute and the provider is caught cheating. The validators may have incentive to execute the contract. Only members of the validation group can execute the contracts, insuring a separation of duties (the provider for example cannot be the issuer and validator at the same time).

The provider is prevented from sending a false response and not appending a smart contract to the second blockchain network.

Indeed, the operation of signing the response and appending the smart contract in steps S4 to S6 is guaranteed to be atomic (one cannot be done without the other) this is achieved by two ways.

In a first way, the second blockchain module BM2 can be executed in the same secure execution environment as the authentication module AM.

In a second way, the second blockchain module BM2 is executed outside the secure execution environment. In this case, the authentication module AM (which is executed inside a secure execution environment) increments a counter for each signing operation, this counter is used as an identifier inside the smart contract. If the created smart contract is not appended to the second blockchain network by the second blockchain module BM2 there will be a visible gap in the counter of subsequent smart contracts.

An embodiment comprises an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

The invention claimed is:

1. A method for securing a blockchain access through a gateway on behalf of a communication device in a wireless telecommunication network, the method comprising the following in an apparatus operating with the gateway:
   receiving a request sent from a communication device through the gateway, the request containing an identifier of the communication device, an identifier of the request and a key,
   checking a distributed blockchain that includes information regarding the communication device and that is stored in a first blockchain network and retrieving a value corresponding to the key,
   creating a smart contract based on the key, the value, a timestamp, the identifier of the communication device, and the identifier of the request, the smart contract being defined to confirm the validity of value corresponding to the key in the first blockchain network,
   appending the smart contract to a second blockchain network, the smart contract having to be executed on the first blockchain network by at least one validator having access to the first blockchain network and second blockchain network,
   signing a response containing the key, the value, and the identifier of the request with a certificate, and
   sending the response to the communication device through the gateway.

2. The method as claimed in claim 1, wherein the apparatus is implemented in a multiple Platform as a Service of a wireless network having specialized components providing customized functionalities.

3. The method as claimed in claim 1, wherein the certificate was previously retrieved from a code generator.

4. The method as claimed in claim 1, wherein the certificate is received from a code generator by a dedicated module for signing the response after verification that the dedicated module is running in a secure environment.

5. The method as claimed in claim 1, wherein the apparatus sends a notification to the validators for getting a reward after having checked that the smart contract has been executed in the first blockchain network.

6. The method as claimed in claim 1, wherein the appending the smart contract to the second blockchain network can be executed in a same secure execution environment as the signing the response.

7. The method as claimed in claim 4, wherein the authentication module increments a counter for each signing operation, this counter being used as an identifier inside the smart contract.

8. An apparatus for securing a blockchain access through a gateway on behalf of a communication device in a wireless telecommunication network, the apparatus comprising:
   one or more network interfaces to communicate with a network;
   a processor coupled to the network interfaces and configured to execute one or more processes; and
   a memory configured to store a process executable by the processor, the process when executed operable to:
   receive a request from a communication device, the request containing an identifier of the communication device, an identifier of the request and a key,
   check a distributed blockchain that includes information regarding the communication device and that is stored in a first blockchain network and retrieving a value corresponding to the key,
   create a smart contract based on the key, the value, a timestamp, the identifier of the communication device, and the identifier of the request, the smart contract being defined to confirm the validity of value corresponding to the key in the first blockchain network,
   append the smart contract to a second blockchain network, the smart contract having to be executed on the first blockchain network by at least one validator having access to the first blockchain network and second blockchain network,
   sign a response containing the key, the value, and the identifier of the request with a certificate, and
   send the response to the communication device.

9. A non-transitory computer-readable medium having embodied thereon a computer program for executing a method for securing a blockchain access through a gateway according to claim 1.

10. A communication device configured to secure a blockchain access through a gateway in a wireless telecommunication network, the communication device comprising:
   at least one processor; and
   at least one memory including executable instructions, the at least one memory and the executable instructions configured to, with the at least one processor, cause the communication device to:
   send a request through the gateway, the request containing an identifier of the communication device, an identifier of the request and a key, and, in response to checking a distributed blockchain that includes information regarding the communication device stored in a first blockchain network and retrieving a value corresponding to the key, creating a smart contract based on the key, the value, a timestamp, the identifier of the communication device, and the identifier of the request, the smart contract being defined to confirm the validity of value corresponding to the key in the first blockchain network, appending the smart contract to a second blockchain network, the smart contract having to be executed on the first blockchain network by at least one validator having access to the first blockchain network and second blockchain network, and signing a response containing the key, the value, and the identifier of the request with a certificate, receive the response through the gateway, the response containing the key, the value, and the identifier of the request with the certificate.

11. The communication device as claimed in claim 10, wherein the certificate was previously retrieved from a code generator.

12. The communication device as claimed in claim 10, wherein the certificate was previously received from a code generator by a dedicated module for signing the response after verification that the dedicated module was running in a secure environment.

* * * * *